(12) United States Patent
Xu

(10) Patent No.: US 9,329,429 B2
(45) Date of Patent: May 3, 2016

(54) POLARIZER AND DISPLAY DEVICE

(71) Applicant: SHENZHEN CHINA STAR OPTOELECTRONICS TECHNOLOGY CO., LTD., Shenzhen (CN)

(72) Inventor: Xiangyang Xu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/416,843

(22) PCT Filed: Sep. 3, 2014

(86) PCT No.: PCT/CN2014/085871
§ 371 (c)(1),
(2) Date: Jan. 23, 2015

(87) PCT Pub. No.: WO2016/023252
PCT Pub. Date: Feb. 18, 2016

(65) Prior Publication Data
US 2016/0048056 A1 Feb. 18, 2016

(30) Foreign Application Priority Data
Aug. 13, 2014 (CN) .......................... 2014 1 0397246

(51) Int. Cl.
G02F 1/1335 (2006.01)
G02B 5/30 (2006.01)
(52) U.S. Cl.
CPC ........ *G02F 1/133528* (2013.01); *G02B 5/3033* (2013.01); *G02F 1/133602* (2013.01); *G02F 2001/133538* (2013.01)

(58) Field of Classification Search
CPC .................. G02F 1/133528; G02F 1/133602; G02B 5/30333
See application file for complete search history.

(56) References Cited

U.S. PATENT DOCUMENTS

| 2004/0027510 A1 | 2/2004 | Iijima et al. |
| 2004/0119661 A1* | 6/2004 | Kunimatsu ........ G02F 1/133528 345/7 |

(Continued)

FOREIGN PATENT DOCUMENTS

| CN | 1450389 A | 10/2003 |
| CN | 101556350 A | 10/2009 |

(Continued)

OTHER PUBLICATIONS

International Search Report and Written Opinion (Forms PCT/ISA/237, PCT/ISA/220 and PCT/ISA/210) issued on May 13, 2015, by the State Intellectual Property Office of the People's Republic of China in corresponding International Application No. PCT/CN2014/086871. (11 pages).

*Primary Examiner* — Mary Ellen Bowman
(74) *Attorney, Agent, or Firm* — Buchanan Ingersoll & Rooney PC

(57) ABSTRACT

A polarizer and a display device are disclosed. The present disclosure belongs to the technical field of display, through which the utilization ratio of the backlight emitted by the backlight module can be improved. The polarizer can be used in a display device and is provided with through holes, and a location of each through hole corresponds to a gate of a corresponding Thin Film Transistor of said display device. The polarizer of the present disclosure can be used in liquid crystal TV, liquid crystal display, mobile phone, tablet personal computer, and other display devices.

9 Claims, 2 Drawing Sheets

(56) References Cited

U.S. PATENT DOCUMENTS

| | | |
|---|---|---|
| 2009/0257004 A1 | 10/2009 | Song |
| 2011/0128475 A1 | 6/2011 | Park et al. |
| 2013/0250224 A1 | 9/2013 | Huo et al. |
| 2014/0292839 A1* | 10/2014 | Huang .............. G02F 1/133533 345/694 |
| 2015/0042928 A1* | 2/2015 | Won .................. G02F 1/133377 349/96 |

FOREIGN PATENT DOCUMENTS

| | | |
|---|---|---|
| CN | 102707487 A | 10/2012 |
| CN | 102998862 A | 3/2013 |

* cited by examiner

POLARIZER AND DISPLAY DEVICE

CROSS REFERENCE TO RELATED APPLICATION

The present application claims benefit of Chinese patent application CN 201410397246.7, entitled "Polarizer and Display Device" and filed on Aug. 13, 2014, which is incorporated herein by reference.

FIELD OF THE INVENTION

The present disclosure relates to the technical field of display, and particularly to a polarizer and a display device.

BACKGROUND OF THE INVENTION

With the development of display technology, the liquid crystal display has become the most commonly used display device.

The liquid crystal display mainly comprises a backlight module, a lower polarizer, an array substrate, a liquid crystal layer, a color film substrate, an upper polarizer, and other components. The brightness of the liquid crystal display depends on the brightness of the backlight emitted by the backlight module, and the utilization ratio of the backlight, which is dependent on the structure of the liquid crystal electric field, the penetration of the liquid crystal material, the aperture ratio of the panel, the penetration of the color film, the penetration of the polarizer and other factors. The backlight emitted by the backlight module comprises the polarized light with various polarization directions, which would be changed into the polarized light with one single polarization direction after passing through the lower polarizer. However, approximately half of the backlight would be lost during this process.

Therefore, how to improve the utilization ratio of the backlight has become an important issue during the design and production of liquid crystal display devices.

SUMMARY OF THE INVENTION

The purpose of the present disclosure is to provide a polarizer and a display device, so as to improve the utilization ratio of the backlight emitted by the backlight module.

The present disclosure provides a polarizer used in a display device, wherein said polarizer is provided with through holes, and a location of each through hole corresponds to a gate of a corresponding Thin Film Transistor (TFT) of said display device.

Preferably, said through hole has a rectangular, trapezoid, or round shape.

Further, said polarizer is further provided with slits, and a location of each slit corresponds to a gate line of said display device.

Preferably, an angle formed by a polarization direction of said polarizer and the gate lines of said display device is 45°.

The present disclosure further provides a display device, comprising a backlight module, and a lower polarizer, an array substrate, a color film substrate, and an upper polarizer arranged on said backlight module in sequence, wherein said lower polarizer is provided with through holes, and a location of each through hole corresponds to a gate of a corresponding thin film transistor of said array substrate.

Preferably, said through hole has a rectangular, trapezoid, or round shape.

Further, said lower polarizer is further provided with slits, and a location of each slit corresponds to a gate line of said display device.

Preferably, an angle formed by a polarization direction of said lower polarizer and the gate lines of said display device is 45°.

Preferably, the polarization direction of said lower polarizer is perpendicular to a polarization direction of said upper polarizer.

The following beneficial effects can be brought about by the present disclosure. According to the present disclosure, the polarizer is arranged between the backlight module and the array substrate, and each through hole of the polarizer corresponds to a corresponding gate of the array substrate. In this case, most of the backlight emitted by the backlight module directly enters into the array substrate through the polarizer, and is changed into the polarized light with one single polarization direction; while a small part of the backlight irradiates the gates of the array substrate through the through holes of the polarizer, is then reflected by the gates to return to the backlight module through the through holes of the polarizer again, and finally reflected to the array substrate by the reflective components of the backlight module.

Since the polarizer according to the present disclosure is provided with through holes corresponding to the gates, a small part of the backlight will pass through the through holes twice before and after the reflection of the gates respectively, while the polarization direction thereof will not be changed by the polarizer. In this case, the loss of the light caused by the polarizer can be avoided, the utilization ratio of the backlight can be improved, and the brightness of the liquid crystal display can be raised.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The drawings necessary for explaining the embodiments are introduced briefly below to illustrate the technical solutions of the embodiments of the present disclosure more clearly.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

Embodiment 1

Figure 1:
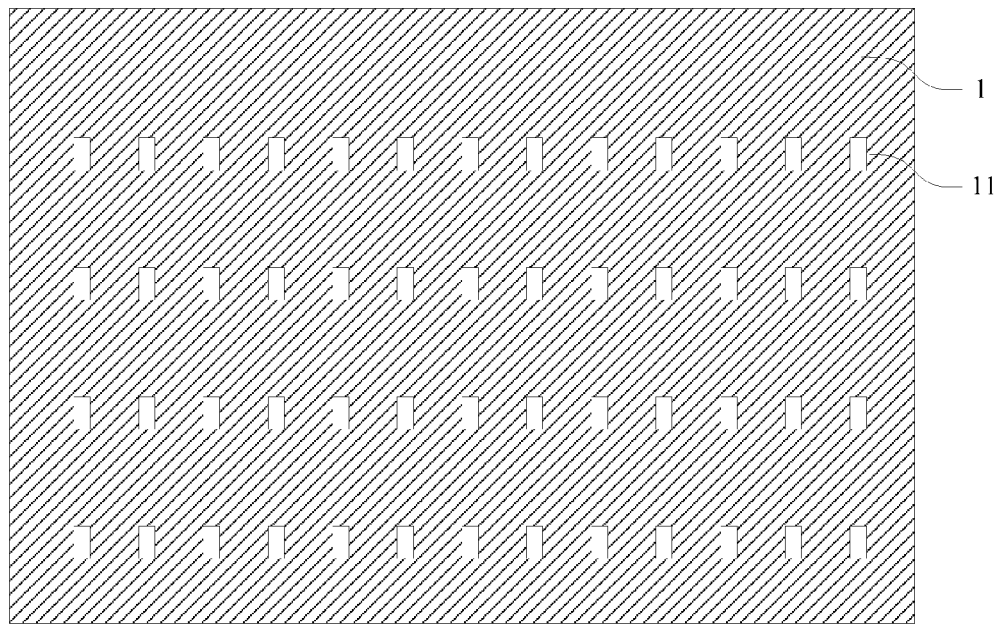
FIG. 1 schematically shows a polarizer according to embodiment 1 of the present disclosure.

As shown in FIG. 1, the embodiment of the present disclosure provides a polarizer 1 used in a display device, which can be arranged between a backlight module and an array substrate. The oblique lines as shown in FIG. 1 indicate that the polarization direction of the polarizer 1 forms an angle of 45° relative to the horizontal direction, that is, the polarization direction of the polarizer 1 forms an angle of 45° relative to the gate lines of the array substrate.

According to the embodiment of the present disclosure, the polarizer 1 is provided with through holes 11, and a location of each through hole 11 corresponds to a gate of a corresponding Thin Film Transistor of the array substrate.

In the present embodiment, the through hole 11 is rectangle, and the shape and size thereof are both the same as those of the gate respectively. In other embodiments, the through hole 11 can be arranged as trapezoid, round, and other shapes according to the shape of the gate.

According to the embodiment of the present disclosure, the polarizer 1 is arranged between the backlight module and the array substrate, so that each through hole 11 of the polarizer 1 corresponds to a corresponding gate of the array substrate. Most of the backlight emitted by the backlight module directly enters into the array substrate through the polarizer 1, is then changed into the polarized light with one single polarization direction, and finally emitted out of the display device. By contrast, a small part of the backlight irradiates the gates of the TFTs of the array substrate through the through holes 11 of the polarizer 1, is then reflected by the gates to return to the backlight module through the through holes 11 of the polarizer 1 again, subsequently reflected to the array substrate by the reflective components of the backlight module, and finally emitted out of the display device.

Since the polarizer 1 according to the embodiment of the present disclosure is provided with through holes 11 corresponding to the gates, a small part of the backlight passes through the through holes 11 twice before and after the reflection of the gates respectively, while the polarization direction thereof is not changed by the polarizer 1. In this case, the loss of the light caused by the polarizer 1 can be avoided, the utilization ratio of the backlight can be improved, and the brightness of the liquid crystal display can be raised.

Embodiment 2

Figure 2:
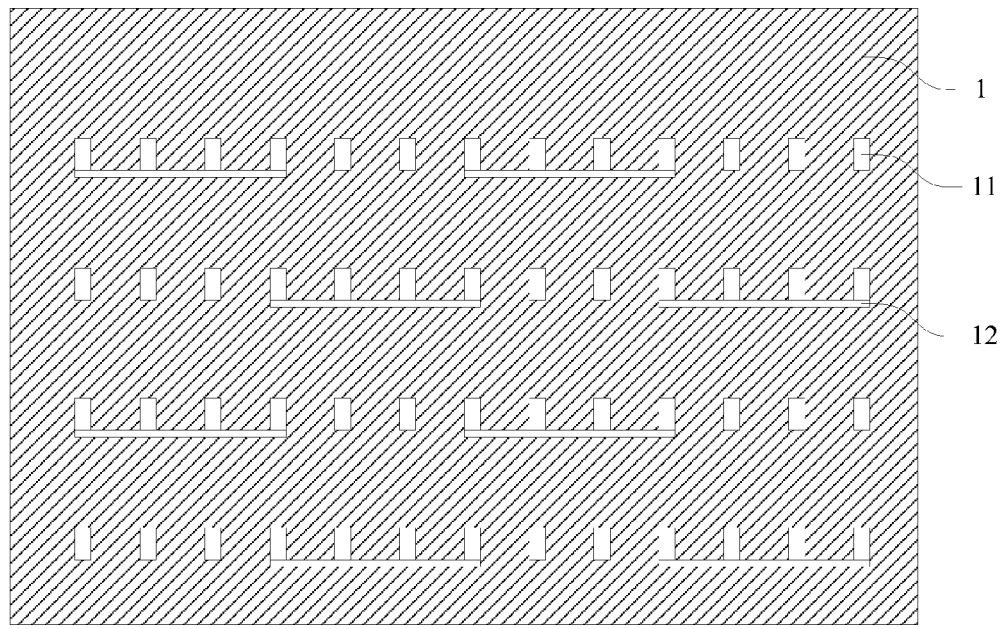
FIG. 2 schematically shows a polarizer according to embodiment 2 of the present disclosure.

As shown in FIG. 2, the polarizer 1 of the present disclosure is further provided with slits 12 on the basis of embodiment 1, wherein a location of each slit 12 corresponds to a gate line of the display device. According to the present embodiment, the slits 12 provided on the polarizer 1 do not correspond to all gate lines of the display device, but only correspond to part of the gate lines of the display device.

Compared with embodiment 1, in this embodiment in addition to part of the backlight emitted by the backlight module which can be reflected back to the backlight module by the gates of the array substrate through the through holes 11 provided on the polarizer 1, there is other part of backlight which irradiates the gate lines of the array substrate through the slits 12 of the polarizer 1, is then reflected by the gate lines to return to the backlight module through the slits 12 of the polarizer 1 again, and subsequently reflected to the array substrate by the reflective components of the backlight module and finally emitted out of the display device.

Therefore, this additional part of backlight passes through the slits 12 twice before and after the reflection of the gate lines respectively, while the polarization direction thereof is not changed by the polarizer 1. In this case, the loss of the light caused by the polarizer 1 can be avoided, the utilization ratio of the backlight can be improved, and the brightness of the liquid crystal display can be raised.

Embodiment 3

Figure 3:
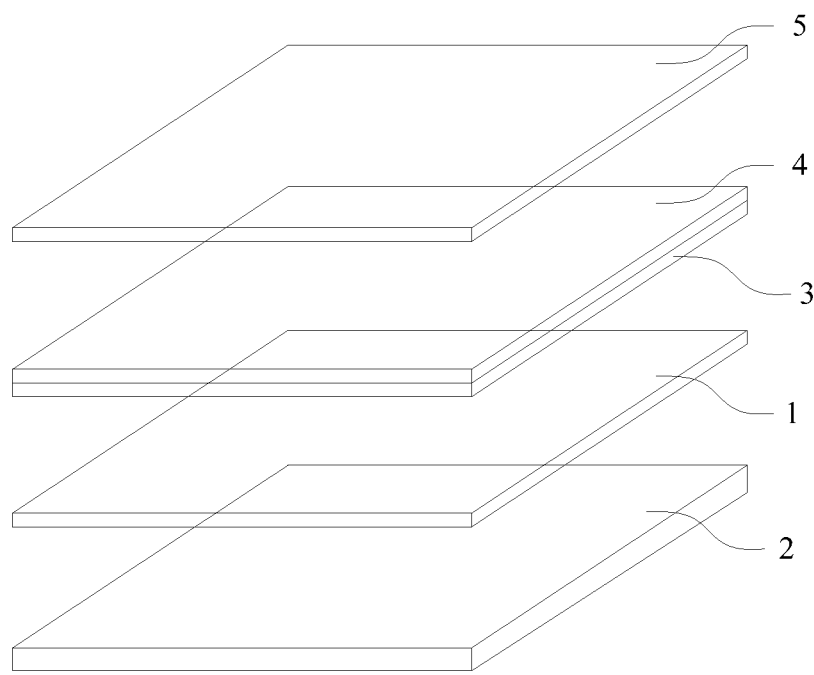
FIG. 3 schematically shows a display device according to embodiment 3 of the present disclosure.

As shown in FIG. 3, a display device is provided by the embodiment of the present disclosure, which may be embodied as liquid crystal TV, liquid crystal display, mobile phone, or tablet personal computer, etc. The display device comprises a backlight module 2, and a lower polarizer 1, an array substrate 3, a liquid crystal layer (not shown in FIG. 3), a color film substrate 4, and an upper polarizer 5 that are arranged on said backlight module in sequence, wherein the lower polarizer 1 may be the polarizer provided by the above embodiment 1 or embodiment 2.

As a preferable technical solution, the polarization direction of the lower polarizer 1 is perpendicular to that of the upper polarizer 5. In this case, if the liquid crystal layer is not driven, the backlight emitted by the backlight module 2 is changed into polarized light with one single polarization direction through the lower polarizer 1, which will be completely shaded by the upper polarizer 5, so that a total black image is displayed.

Since the display device provided by the embodiment of the present disclosure has the same technical features as the polarizer provided by the above embodiments, they can solve the same technical problem and achieve the same technical effect.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A polarizer used in a display device, wherein said polarizer is provided with through holes, and a location of each through hole corresponds to a gate of a corresponding thin film transistor of said display device.

2. The polarizer according to claim 1, wherein said through hole has a rectangular, trapezoid, or round shape.

3. The polarizer according to claim 1, wherein said polarizer is further provided with slits, and a location of each slit corresponds to a gate line of said display device.

4. The polarizer according to claim 1, wherein an angle formed by a polarization direction of said polarizer and the gate lines of said display device is 45°.

5. A display device, comprising a backlight module, and a lower polarizer, an array substrate, a color film substrate, and an upper polarizer arranged on said backlight module in sequence, wherein said lower polarizer is provided with through holes, and a location of each through hole corresponds to a gate of a corresponding thin film transistor of said array substrate.

6. The display device according to claim 5, wherein said through hole has a rectangular, trapezoid, or round shape.

7. The display device according to claim 5, wherein said lower polarizer is further provided with slits, and a location of each slit corresponds to a gate line of said array substrate.

8. The display device according to claim 5, wherein an angle formed by a polarization direction of said lower polarizer and the gate lines of said array substrate is 45°.

9. The display device according to claim 5, wherein the polarization direction of said lower polarizer is perpendicular to a polarization direction of said upper polarizer.

* * * * *